(12) United States Patent
Toyota et al.

(10) Patent No.: US 9,963,173 B2
(45) Date of Patent: May 8, 2018

(54) VEHICLE PILLAR STRUCTURE

(71) Applicant: TOYOTA JIDOSHA KABUSHIKI KAISHA, Toyota-shi (JP)

(72) Inventors: Masaru Toyota, Toyota (JP); Taichi Minei, Toyota (JP); Shin Terada, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days. days.

(21) Appl. No.: 15/340,280

(22) Filed: Nov. 1, 2016

(65) Prior Publication Data

US 2017/0183039 A1 Jun. 29, 2017

(30) Foreign Application Priority Data

Dec. 25, 2015 (JP) ................................. 2015-254228

(51) Int. Cl.
*B62D 25/04* (2006.01)
*B62D 21/15* (2006.01)

(52) U.S. Cl.
CPC ........... *B62D 25/04* (2013.01); *B62D 21/152* (2013.01); *B60Y 2306/01* (2013.01)

(58) Field of Classification Search
CPC ...................................................... B62D 25/04
USPC ............................... 296/96.12, 96.18, 193.06
See application file for complete search history.

(56) References Cited

U.S. PATENT DOCUMENTS

| 1,593,005 | A | * | 7/1926 | Bailey | ...................... | B60J 10/70 |
| | | | | | | 296/193.06 |
| 5,941,596 | A | * | 8/1999 | See | ........................... | B60J 1/02 |
| | | | | | | 296/193.06 |
| 6,669,275 | B2 | * | 12/2003 | Frasher | ................... | B60R 21/04 |
| | | | | | | 296/146.1 |
| 9,227,673 | B2 | * | 1/2016 | Berger | ..................... | B29C 70/68 |
| 2011/0248525 | A1 | | 10/2011 | Lundstroem | | |

FOREIGN PATENT DOCUMENTS

| DE | 10125171 A1 * | 11/2002 | ............. B62D 25/04 |
| DE | 102004056075 A1 * | 5/2006 | ......... B29C 45/0013 |
| EP | 0686543 A1 * | 12/1995 | ............. B62D 25/04 |
| EP | 2852501 B1 * | 11/2016 | ................ B60J 1/02 |
| FR | 2990650 A1 * | 11/2013 | ............. B62D 25/06 |
| FR | 2990650 B1 * | 5/2014 | ............. B62D 25/06 |
| GB | 2457034 A * | 8/2009 | ............. B62D 25/04 |

(Continued)

*Primary Examiner* — Dennis H Pedder
(74) *Attorney, Agent, or Firm* — Oblon, McClelland, Maier & Neustadt, L.L.P.

(57) ABSTRACT

A vehicle pillar structure comprises a pillar portion, the pillar portion extends in parallel with an outer side end portion in a vehicle transverse direction of a windshield glass and, as viewed from a longitudinal direction of the pillar portion, has a hollow structure. The pillar portion comprises an outer side wall forming a wall portion at a vehicle outer side of the pillar portion, an inner side wall forming a wall portion at a vehicle cabin side of the pillar portion, and a pair of side walls linking the outer side wall and the inner side wall together. At least a portion of the outer side wall is an outer side transparent portion, and at least a portion of the inner side wall is an inner side transparent portion that is disposed so as to face the outer side transparent portion as viewed by a driver.

7 Claims, 3 Drawing Sheets

(56) References Cited

FOREIGN PATENT DOCUMENTS

| | | |
|---|---|---|
| JP | 2001-026283 A | 1/2001 |
| JP | 2007-196749 | 8/2007 |
| JP | 3151438 U | 6/2009 |
| JP | 2011-088494 A | 5/2011 |
| JP | 2013-75661 | 4/2013 |
| WO | WO 2014073498 A1 * | 5/2014 ............. B62D 25/04 |

* cited by examiner

VEHICLE PILLAR STRUCTURE

CROSS-REFERENCE TO RELATED APPLICATION

This application claims priority under 35 USC 119 from Japanese Patent Application No. 2015-254228 filed on Dec. 25, 2015, the disclosure of which is incorporated by reference herein in its entirety.

BACKGROUND

Technical Field

Preferred embodiments relate to a vehicle pillar structure.

Related Art

In a front pillar described in Japanese Patent Application Laid-Open (JP-A) No. 2013-75661, the front pillar is formed from a transparent resin material. Accordingly, the occurrence of blind spot areas where the driver's view is blocked by the front pillar is reduced.

SUMMARY

However, because the aforementioned front pillar is a solid structure, there is a possibility that the visibility of objects outside the vehicle that are viewed through the front pillar will be reduced. Namely, because the front pillar is formed as a solid structure, the transparent resin portion through which light is transmitted has a considerable thickness. Because of this, there is a possibility that objects will appear more distorted due to the refraction of the light that is transmitted through the transparent resin portion. This causes the visibility of these objects to be reduced. Accordingly, in a vehicle pillar structure, a structure that enables visibility to be improved is desired.

In consideration of the above circumstances, an object of preferred embodiments is to provide a vehicle pillar structure that enables driver's visibility for objects at the vehicle exterior side to be improved.

A vehicle pillar structure of a first aspect of the disclosure has a pillar portion that extends in parallel with an outer side end portion in a vehicle transverse direction of a windshield glass and, as viewed from a longitudinal direction of the pillar portion, the pillar portion has a hollow structure. The pillar portion includes an outer side wall forming a wall portion at a vehicle outer side of the pillar portion, an inner side wall forming a wall portion at a vehicle cabin side of the pillar portion, and a pair of side walls linking the outer side wall and the inner side wall together. At least a portion of the outer side wall is an outer side transparent portion and at least a portion of the inner side wall is an inner side transparent portion that is disposed so as to face the outer side transparent portion as viewed by a driver.

The vehicle pillar structure according to the first aspect has a pillar portion. The pillar portion extends in parallel with a vehicle transverse direction outer side end portion of the windshield glass, and is formed to be a hollow structure as viewed in the longitudinal direction of the pillar portion. Moreover, the pillar portion includes an outer side wall that forms a wall portion at the vehicle exterior side of the pillar portion, an inner side wall that forms a wall portion at the vehicle cabin side of the pillar portion, and a pair of side walls that link the outer side wall and the inner side wall together.

At least a portion of the outer side wall is formed as an outer side transparent portion, and at least a portion of the inner side wall is formed as an inner side transparent portion. Moreover, as viewed by the driver, the inner side transparent portion is disposed such that the inner side transparent portion overlaps with the outer side transparent portion. Because of this, the driver is able to view objects outside the vehicle through the inner side transparent portion and the outer side transparent portion. In addition, as is described above, because the pillar portion is formed as a hollow structure, compared with a pillar portion that is formed as a solid structure, the plate thicknesses of the inner side transparent portion and the outer side transparent portion can be made thinner. As a consequence, it is possible to largely prevent any increase in the distortion of an object that is caused by the refraction of light transmitted through the inner side transparent portion and the outer side transparent portion. Accordingly, it is possible to improve the visibility of objects on the vehicle exterior side of the pillar portion as seen by the driver.

A vehicle pillar structure of a second aspect of the disclosure includes the vehicle pillar structure according to the first aspect in which portions of the pillar portion other than the outer side transparent portion and the inner side transparent portion are high-strength portions that have a higher flexural strength than the outer side transparent portion and the inner side transparent portion.

In the vehicle pillar structure according to the second aspect, because portions of the pillar portion other than the outer side transparent portion and the inner side transparent portion are high-strength portions that have a higher flexural strength than the outer side transparent portion and the inner side transparent portion, the flexural strength of the pillar portion can be guaranteed even though the pillar portion is formed as a hollow structure.

A vehicle pillar structure of a third aspect of the disclosure includes the vehicle pillar structure according to the second aspect in which a first holding portion is provided at one of the pair of side walls, the first holding portion protrudes towards an inner side of the hollow structure and holds a vehicle transverse direction outer side end portion of the windshield glass. A second holding portion is provided at another of the pair of side wall, the second holding portion protrudes towards the inner side of the hollow structure, and holds a sealing component, and the high-strength portions are formed from an opaque material.

In the vehicle pillar structure according to the third aspect, a first holding portion is formed at one of the pair of side wall of the pillar portion, and this first holding portion protrudes towards the inside of the hollow structure of the pillar portion so as to hold a vehicle transverse direction outer side end portion of the windshield glass. Moreover, a second holding portion is formed at another of the pair of the side wall of the pillar portion, and the second holding portion protrudes towards the inside of the hollow structure of the pillar portion so as to hold a sealing component. Namely, the first holding portion and the second holding portion are disposed as high-strength portions.

The high-strength portions are formed from an opaque material. Because of this, the portion of the first holding portion that holds the windshield glass and the portion of the second holding portion that holds the sealing component are prevented from being visible from the vehicle cabin interior. As a consequence, it is possible to improve the visibility of an object on the vehicle outer side of the pillar portion as seen by the driver, while improving the design aspect of the vehicle as seen from the vehicle cabin interior.

A vehicle pillar structure of a fourth aspect of the disclosure includes the vehicle pillar structure according to the third aspect in which transverse direction outer side end portions of the outer side wall and the inner side wall that are connected to the pair of side walls, and the transverse direction outer side end portions are formed by the high-strength portions.

In the vehicle pillar structure according to the fourth aspect, transverse direction outer side end portions of the outer side wall are formed by the high-strength portions. In addition, as is described above, the high-strength portions are formed from an opaque material. Because of this, the first holding portion and the second holding portion are prevented from being visible from outside the vehicle by the transverse direction outer side end portions of the outer side wall. Furthermore, transverse direction outer side end portions of the inner side wall are formed by the high-strength portions. Because of this, the first holding portion and the second holding portion are prevented from being visible from the vehicle cabin interior by the transverse direction outer side end portions of the inner side wall. As a result of this, it is possible to improve the visibility of an object on the vehicle outer side of the pillar portion as seen by the driver, while further improving the design aspect of the vehicle as seen from outside the vehicle and from the vehicle cabin interior.

A vehicle pillar structure of a fifth aspect of the disclosure includes the vehicle pillar structure according to any of the first through fourth aspects in which a plate thickness of the outer side transparent portion and the inner side transparent portion is from 0.5 mm to 5 mm.

In the vehicle pillar structure according to the fifth aspect, because the plate thickness of the outer side transparent portion and the inner side transparent portion is set to not less than 0.5 mm and not more than 5 mm, it is possible to prevent any increase in the distortion of an object that is caused by the refraction of light transmitted through the inner side transparent portion and the outer side transparent portion, while still maintaining the strength of the pillar portion. Accordingly, it is possible to effectively improve the visibility of objects on the vehicle exterior side of the pillar portion as seen by the driver.

A vehicle pillar structure of a sixth aspect of the disclosure includes the fifth aspect in which, in a planar cross-sectional view from a vehicle upper side, the outer side transparent portion is formed in a curved shape that protrudes towards the vehicle outer side, and the inner side transparent portion is formed in a curved shape that protrudes towards a vehicle cabin interior side, and a radius of curvature of the outer side transparent portion and the inner side transparent portion is 500 mm or more.

In the vehicle pillar structure according to the sixth aspect, because the radius of curvature of the outer side transparent portion and the inner side transparent portion is set to 500 mm or more, the outer side transparent portion and the inner side transparent portion can be formed in a substantially planar shape. As a consequence, when viewing objects outside the vehicle via the inner side transparent portion and the outer side transparent portion, it is possible to even further prevent these objects on the vehicle exterior side of the pillar portion from appearing distorted.

A vehicle pillar structure of a seventh aspect of the disclosure includes the vehicle pillar structure according to any of the second through fourth aspects in which the outer side transparent portion and the inner side transparent portion are formed from a transparent resin material, and the high-strength portions are formed from carbon fiber-reinforced plastic.

In the vehicle pillar structure according to the seventh aspect, because the outer side transparent portion, the inner side transparent portion, and the high-strength portions are formed from a resin material, it is easy to form the outer side transparent portion, the inner side transparent portion, and the high-strength portions as a single integral body.

Because of this, compared, for example, with when the outer side transparent portion, inner side transparent portion, and the high-strength portions are bonded together by adhesion or the like, it is possible to bond the outer side transparent portion, the inner side transparent portion, and the high-strength portions together extremely strongly while preventing the pillar portion from becoming bulkier in size.

A vehicle pillar structure of an eighth aspect of the disclosure includes the vehicle pillar structure according to the fourth aspect in which, in a planar cross-sectional view from a vehicle upper side, the outer side wall is provided with the transverse direction outer side end portions on both sides of the outer side transparent portion, and the inner side wall is provided with the transverse direction outer side end portions on both sides of the inner side transparent portion.

In the vehicle pillar structure according to the eighth aspect, as is described above, the transverse direction outer side end portions on both sides of the outer side transparent portion, and the transverse direction outer side end portions on both sides of the inner side transparent portion are high-strength portions, and are formed from an opaque material. Because of this, in the facing direction in which the outer side transparent portion and the inner side transparent portion oppose each other, the first holding portion of the one side wall and the second holding portion of the other side wall are prevented from being visible from outside the vehicle by the transverse direction outer side end portions of the outer side wall, and the first holding portion (40A) and the second holding portion are prevented from being visible in the facing direction from the cabin C side by the transverse direction outer side end portions of the inner side wall. As a consequence, it is possible to improve the visibility of an object on the vehicle exterior side of the pillar portion as seen by the driver while further improving the design aspect of the vehicle as seen from both the outside of the vehicle and the vehicle cabin interior side.

BRIEF DESCRIPTION OF THE DRAWINGS

Preferred embodiments will be described in detail based on the following figures, wherein.

DETAILED DESCRIPTION

Hereinafter, a vehicle pillar structure S according to the present exemplary embodiment will be described using the drawings. Note that an arrow FR, an arrow UP, and an arrow RH that are shown where appropriate in the drawings respectively indicate a vehicle front side, a vehicle upper side, and a vehicle right-hand side of a vehicle V to which the vehicle pillar structure S has been applied. Moreover, if simple front-rear, up-down, or left-right directions are used in the following description, then, unless specifically stated otherwise, these refer respectively to the front-rear directions of the vehicle, the up-down directions of the vehicle, and the left-right directions of the vehicle (i.e., the vehicle transverse direction).

Figure 2:
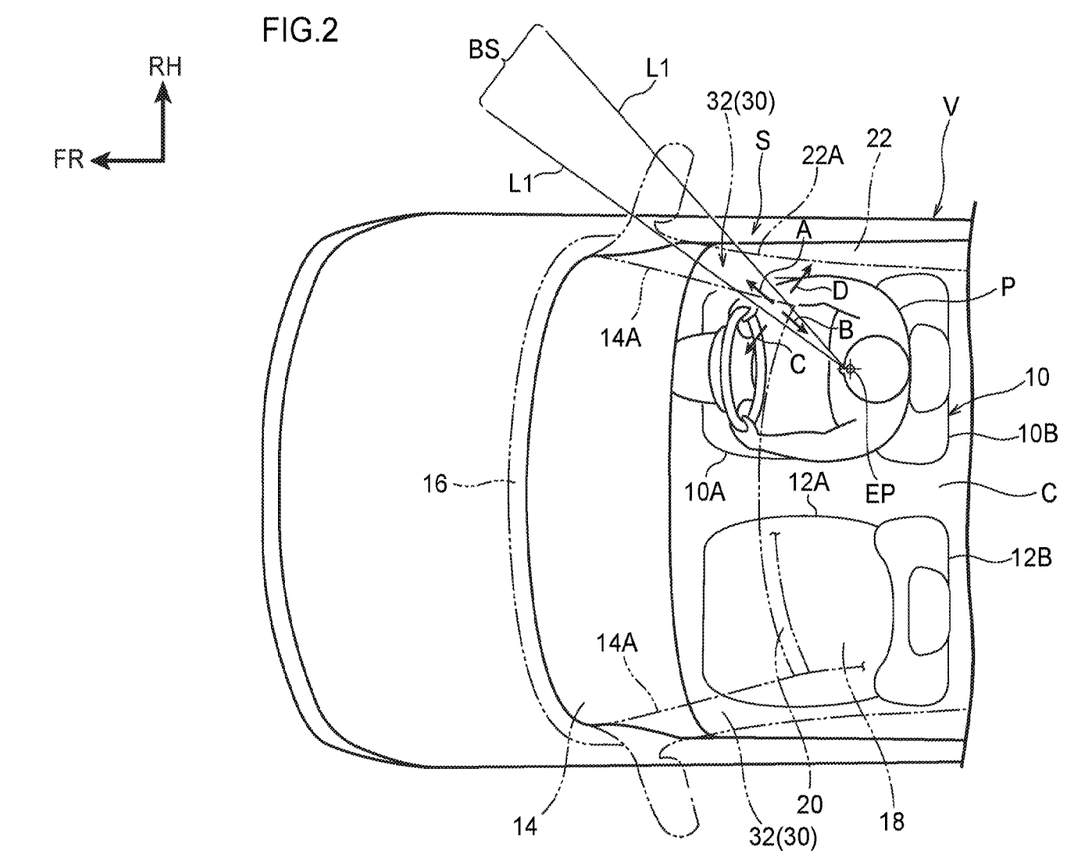
FIG. 2 is a typical plan view showing a front portion of a cabin interior of a vehicle to which the front pillar shown in FIG. 1 has been applied.

Hereinafter, a schematic structure of the vehicle V to which the vehicle pillar structure S is applied will firstly be described. In FIG. 2, a front portion of an interior of a vehicle cabin C of the vehicle V is shown in a plan view. As is shown in this drawing, a vehicle seat 10 for a driver is disposed on a right-side of the front portion of the vehicle cabin C. This vehicle seat 10 is constructed so as to include a seat cushion 10A on which a vehicle occupant P (hereinafter, referred to as a 'driver P') sits, and a seat back 10B that supports a back portion of the driver P. A bottom end portion of the seat back 10B is linked to a rear end portion of the seat cushion 10A.

A vehicle seat 12 for a passenger is disposed on a left-side of the front portion of the vehicle cabin C. In the same way as the vehicle seat 10, the vehicle seat 12 is constructed so as to include a seat cushion 12A, and a seat back 12B. From the above description it can be seen that the vehicle V is a right-hand drive vehicle.

Windshield glass 14 is provided at the front end of the cabin C of the vehicle V. The windshield glass 14 is formed in a transparent plate shape and, when seen in a side view, is disposed such that it slopes towards the rear as it moves upwards (see FIG. 3). A central portion in the vehicle transverse direction of the windshield glass 14 is formed in a curved shape that bulges slightly towards the front side. Vehicle transverse direction outer side end portions 14A of the windshield glass 14 are held by pillar portions 32 of front pillars 30 (described below). A bottom end portion of the windshield glass 14 is fixed by means of an adhesive agent (not shown in the drawings) to a cowl 16 that extends in parallel with the vehicle transverse direction. The cowl 16 is disposed along a top end portion of a dash panel (not shown in the drawings) that forms a front portion of the cabin C. A top end portion of the windshield glass 14 is fixed by means of an adhesive agent (not shown in the drawings) to a front header 20 that is arranged in parallel with the vehicle transverse direction at a front end portion of a roof 18 that forms an upper portion of the cabin C.

Figure 3:
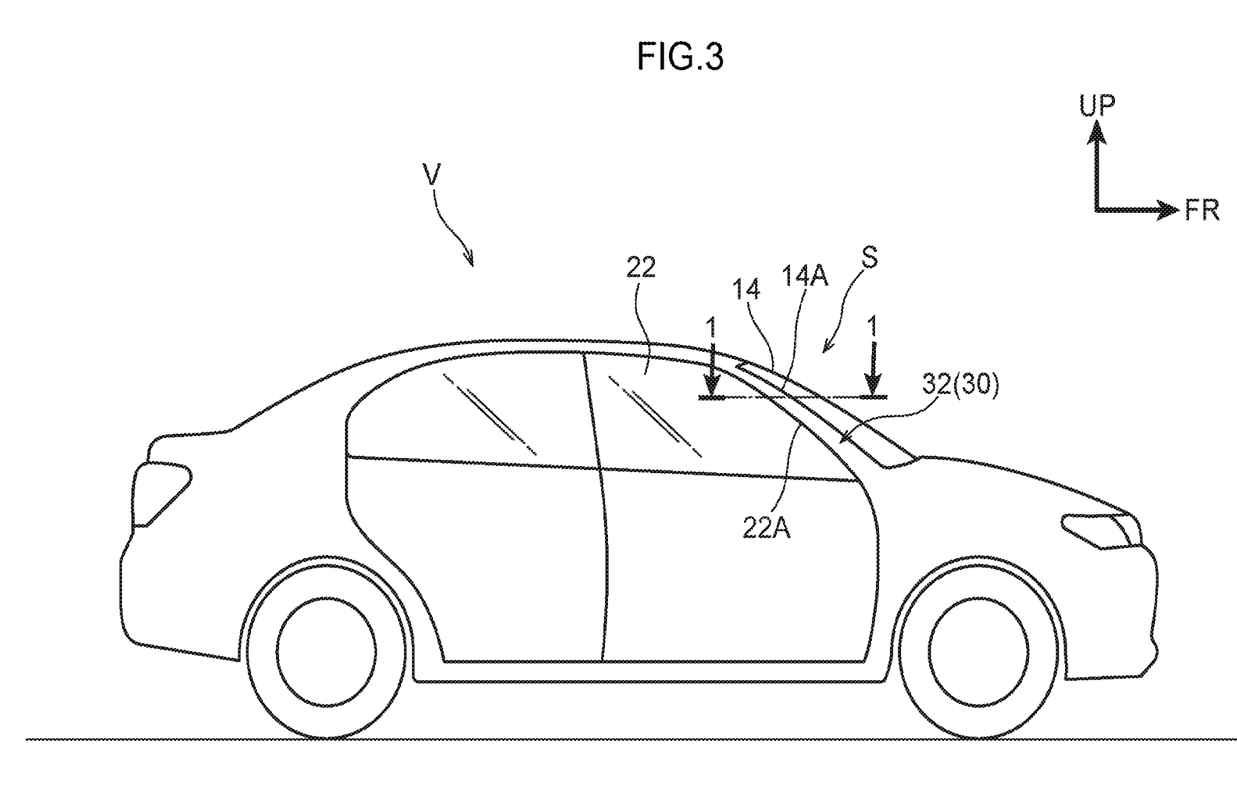
FIG. 3 is a side view as seen from the right-hand side showing the entire vehicle shown in FIG. 2.

Moreover, as is shown in FIG. 3, side door glass 22 that is formed in a transparent plate shape is provided at a side portion of the cabin C. Each front pillar 30 is located between a front end portion 22A of the side door glass 22 and the vehicle transverse direction outer side end portion 14A of the windshield glass 14.

Next, the front pillar 30 will be described. As is shown in FIG. 2, a pair of front pillars 30 are provided with one front pillar 30 being provided on each side in the vehicle transverse direction of the windshield glass 14. The vehicle pillar structure S of the present exemplary embodiment is used in the front pillar 30 on the driver's seat side (i.e., the right-hand side). Because of this, in the following description, principally, the right-hand side front pillar 30 is described.

The front pillar 30 is made from resin. The front pillar 30 has the pillar portion 32, and the pillar portion 32 is disposed on the outer side in the vehicle transverse direction of the windshield glass 14, and extends in parallel with the vehicle transverse direction outer side end portion 14A of the windshield glass 14. The pillar portion 32 is formed in the shape of a hollow column (described below in detail). An upper-side mounting portion (not shown in the drawings) that forms an upper end of the front pillar 30 is provided at a top end of the pillar portion 32, and the upper-side mounting portion is mounted on the front header 20 via a bracket or the like. A lower-side mounting portion (not shown in the drawings) that forms a lower end of the front pillar 30 is provided at a bottom end of the pillar portion 32, and the lower-side mounting portion is mounted on a top end portion of a front pillar lower member (not shown in the drawings) that is made from metal and extends in a substantially up-down direction.

As is described above, the pillar portion 32 extends in parallel with the vehicle transverse direction outer side end portion 14A of the windshield glass 14. Because of this, when seen in a side view, the pillar portion 32 is disposed such that it slopes towards the rear as it moves upwards, and is disposed diagonally forwards and to the right as seen by the driver P. As a consequence, the view diagonally forwards and to the right of the driver P is obstructed by the pillar portion 32, and this obstructed area forms a blind spot area BS.

Specifically, an area that is on the vehicle exterior side of the pillar portion 32, and that lies between a pair of tangent lines L1 that extend out from an eye point EP of the driver P to touch the external outlines of the pillar portion 32 forms the blind spot area BS, as shown in FIG. 2. Note that the eye point EP of the driver P is an intermediate point on a line that connects together both eyes of the driver P.

In the following description, when seen in plan view, a direction in which the position of the eye point EP of the driver P and the pillar portion 32 face each other is referred to as a facing direction (see the arrow A and the arrow B in FIG. 1 and FIG. 2), while a direction that is perpendicular to the facing direction when seen in plan view is referred to as a perpendicular direction (see the arrow C and the arrow D in FIG. 1 and FIG. 2). Note that the position of the eye point EP of the driver P is set using, for example, a dummy (as an example, an AM50 dummy which covers a range of 50% of the body shapes of North American and European male body types starting from the smallest physique) and is determined based on the position of the eye point EP of the dummy when the dummy is seated in the vehicle seat 10 in a driving posture.

A door seal 56, which is described later, is also a factor forming the blind spot as seen by the driver P, however, here, as is shown in FIG. 2, because the 'pillar portion 32' is the most noticeable object in a birds-eye view of the vehicle V, the effects of the door seal 56 have been omitted from this description.

Figure 1:
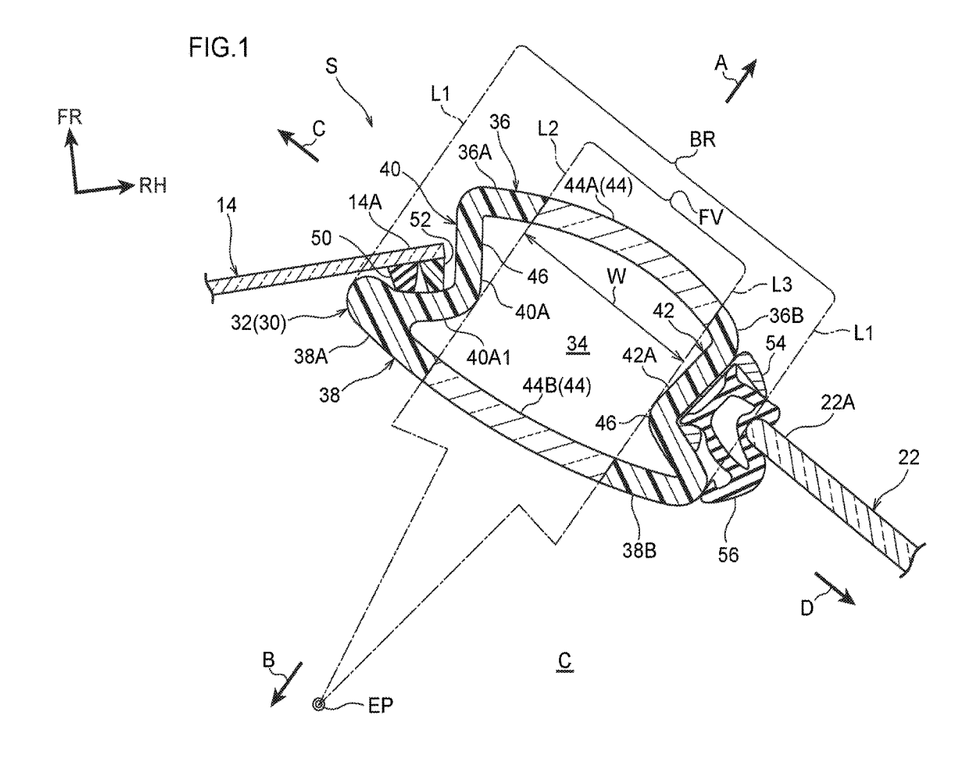
FIG. 1 is a planar cross-sectional view (taken along a line 1-1 in FIG. 3) showing a front pillar portion to which the vehicle pillar structure according to the present exemplary embodiment has been applied.

As is shown in FIG. 1, when seen in plan view, the pillar portion 32 is formed as a hollow structure 34 having a substantially elliptical cross section shape, and whose longitudinal direction is substantially parallel with the above-described perpendicular direction. Specifically, the pillar portion 32 is formed so as to include an outer side wall 36 that forms a wall portion on the vehicle exterior side (i.e., the side in the direction indicated by the arrow A in FIG. 1) of the pillar portion 32, and an inner side wall 38 that forms a wall portion on the cabin C side (i.e., the side in the direction indicated by the arrow B in FIG. 1) of the pillar portion 32. The outer side wall 36 and the inner side wall 38 are disposed such that they oppose each other in substantially the above-described facing direction. The pillar portion 32 also has a pair of side walls 40 and 42 that join together outer side wall 36 and the inner side wall 38, and the side walls 40 and 42 are disposed such that they face each other in substantially the perpendicular direction. In the present exemplary embodiment, apart from a boundary portion between the inner side wall 38 and the side wall 40, the plate thickness of the pillar portion 32 is set to a uniform plate thickness (i.e., 5 mm). Note that FIG. 1 is a planar cross-sectional view of the pillar portion 32 at the position of the eye point EP.

In a planar cross-sectional view seen from the vehicle upper side, the outer side wall 36 is formed in a curved shape that bulges slightly towards the vehicle outer side, more specifically, diagonally towards the front and right-hand sides, and a radius of curvature of the outer side wall 36 is set to 500 mm or more. In the present exemplary embodiment, the radius of curvature of the outer side wall 36 is set to 500 mm. On the other hand, in the planar cross-sectional view, the inner side wall 38 is formed in a curved shape that bulges slightly towards the cabin C side, more specifically, diagonally towards the rear and left-hand sides, and a radius of curvature of the inner side wall 38 is set to 500 mm or more. In the present exemplary embodiment, the radius of curvature of the inner side wall 38 is set to 1000 mm. Note that the radius of curvature of each of the outer side wall 36 and of the inner side wall 38 can be appropriately modified depending on the design and the like of the vehicle V. For example, the radius of curvature of the outer side wall 36 and of the inner side wall 38 of the pillar portion 32 may gradually change such that they become gradually larger as they move from the top end of the pillar portion 32 towards the bottom end thereof. Furthermore, although no particular upper limit has been stipulated for the radius of curvature of the outer side wall 36 and of the inner side wall 38, it is also possible, for example, for an upper limit of 1000 mm to be set for the radius of curvature of the outer side wall 36 and of the inner side wall 38.

A first holding portion 40A that is used to hold the windshield glass 14 is formed at the side wall 40 on the inner side in the vehicle transverse direction, in other words, on the windshield glass 14 side of the pillar portion 32. When seen in a planar cross-section, the first holding portion 40A is formed substantially in an inverted L shape that is open on the front side and on the inner side in the vehicle transverse direction, and protrudes towards the inner side of the hollow structure 34 of the pillar 32 relative to the inner side ends in the vehicle transverse direction of the outer side wall 36 and the inner side wall 38. Moreover, a wall of the first holding portion 40A that is connected to the inner side wall 38 forms a holding wall 40A1 that holds the windshield glass 14 and, when seen in plan view, the holding wall 40A1 is disposed such that a plate thickness direction thereof extends substantially in the front-rear direction.

An adhesive agent 50 such as a urethane sealant is directly coated onto a front surface of the holding wall 40A1, and the vehicle transverse direction outer side end portion 14A of the windshield glass 14 is held via the adhesive agent 50. The adhesive agent 50 is able to expand and contract elastically and, in addition to providing a seal between the windshield glass 14 and the front pillar 30, uses its elasticity to absorb expansion and contraction differences between the windshield glass 14 and the front pillar 30 that are caused by changes in temperature. Furthermore, a molding 52 is disposed at a position on the outer side in the vehicle transverse direction relative to the adhesive agent 50 between the outer side end portion 14A of the windshield glass 14 and the holding wall 40A1. The gap that exists between the windshield glass 14 and the holding wall 40A1 is filled by the molding 52.

A second holding portion 42A that is used to hold the door seal 56 (described below) is formed at the side wall 42 on the outer side in the vehicle transverse direction, in other words, on the side door glass 22 side of the pillar portion 32. When seen in a planar cross-section, the second holding portion 42A is formed substantially in an L shape that is open on the rear side and on the outer side in the vehicle transverse direction, and protrudes towards the inner side of the hollow structure 34 of the pillar 32 relative to the outer side ends in the vehicle transverse direction of the outer side wall 36 and the inner side wall 38.

A retainer 54 that is formed by bending belt-shaped stainless steel or the like is provided at the second holding portion 42A. When seen in plan view, the retainer 54 is formed substantially in a U shape that is open to the rear side and the outer side in the vehicle transverse direction. A bottom wall of the retainer 54 is fixed by means of fastening components such as screws or the like (not shown in the drawings) to a wall portion of the second holding portion 42A that is connected to the outer side wall 36.

A door seal 56 that serves as a "sealing component" is fitted in the retainer 54. The door seal 56 is formed from a resilient material such as ethylene propylene rubber (EPDM). As a consequence, a structure is created in which the door seal 56 is held in the second holding portion 42A via the retainer 54, and the front end portion 22A of the side door glass 22 is held in the second holding portion 42A via the door seal 56.

Here, the front pillar 30 is formed so as to include a transparent portion 44 and a high-strength portion 46. The transparent portion 44 is formed from a transparent resin material and, in the present exemplary embodiment, is made from fiber-reinforced plastic, for example, from glass fiber-reinforced polycarbonate having a flexural strength of 120 MPa. The high-strength portion 46 that is formed from an opaque resin material and, in the present exemplary embodiment, is made from carbon fiber-reinforced plastic, for example, from carbon fiber-reinforced polycarbonate having a flexural strength of 400 MPa.

The transparent portion 44 forms an intermediate portion in the transverse direction of the outer side wall 36, namely, forms portions other than transverse direction outer side end portions 36A and 36B of the outer side wall 36, and the transparent portion 44 forms an outer side transparent portion 44A. The outer side transparent portion 44A extends over the entire longitudinal direction of the pillar portion 32. Furthermore, the transparent portion 44 also forms an intermediate portion in the transverse direction of the inner side wall 38, namely, forms portions other than transverse direction outer side end portions 38A and 38B of the inner side wall 38, and the transparent portion 44 forms an inner side transparent portion 44B. The inner side transparent portion 44B extends over the entire longitudinal direction of the pillar portion 32. In the pillar portion 32, portions other than the outer side transparent portion 44A and the inner side transparent portion 44B are formed by the high-strength portions 46, and the outer side transparent portion 44A, the inner side transparent portion 44B, and the high-strength portions 46 are formed as an integral body. In addition, as is described above, because the flexural strength of the resin material used to form the high-strength portions 46 is set higher than the flexural strength of the resin material used to form the outer side transparent portion 44A and the inner side transparent portion 44B, a structure is created in which the overall flexural strength of the pillar portion 32 is secured principally by the high-strength portions 46.

The outer side transparent portion 44A and the inner side transparent portion 44B are arranged such that they overlap each other as seen by the driver P. Namely, the outer side transparent portion 44A and the inner side transparent portion 44B are disposed such that they face each other in substantially the facing direction. As a consequence, a structure is created in which an object positioned in the blind spot area BS is visible to the driver P via the outer side transparent portion 44A and the inner side transparent portion 44B. Namely, a structure is created in which, a field of view FV where an area outside the vehicle is visible is formed in the above-described blind spot area BS of the pillar portion 32 by the outer side transparent portion 44A and the inner side transparent portion 44B. In other words, a structure is created in which, in the pillar portion 32, the blind spot area that is created by the pillar portion 32 is made narrower by the outer side transparent portion 44A and the inner side transparent portion 44B.

Here, the field of view FV is an area between a reference line L2 that connects together the eye point EP of the driver P and the inner side end in the vehicle transverse direction of the outer side transparent portion 44A, and a reference line L3 that connects together the eye point EP of the driver P and the outer side end in the vehicle transverse direction of the outer side transparent portion 44A. A transverse dimension W of the field of view FV in the front pillar 30 is set, as an example, to 65 mm or more.

The above-described first holding portion 40A of the pillar portion 32 is disposed such that it does not protrude on the side wall 42 side (i.e., on the side indicated by the arrow D in FIG. 1) beyond the reference line L2, so that a structure is created in which the field of view FV is not made narrower by the first holding portion 40A. In addition, the portion of the first holding portion 40A that protrudes the furthest towards the interior of the hollow structure 34 is disposed such that it just touches the reference line L2. Furthermore, the above-described second holding portion 42A of the pillar portion 32 is disposed such that it does not protrude on the side wall 40 side (i.e., on the side indicated by the arrow C in FIG. 1) beyond the reference line L3, so that a structure is created in which the field of view FV is not made narrower by the second holding portion 42A. In addition, in the present exemplary embodiment, the portion of the second holding portion 42A that protrudes the furthest towards the interior of the hollow structure 34 is disposed such that it just touches the reference line L3.

The transverse direction outer side end portion 38A of the inner side wall 38 is disposed such that it does not protrude on the side wall 42 side beyond the reference line L2, so that a structure is created in which the field of view FV is not made narrower by the transverse direction outer side end portion 38A. In other words, a structure is employed in which the first holding portion 40A is not visible from the cabin C side by the transverse direction outer side end portion 38A of the inner side wall 38. Furthermore, the transverse direction outer side end portion 38B of the inner side wall 38 is disposed such that it does not protrude on the side wall 40 side beyond the reference line L3, so that a structure is created in which the field of view FV is not made narrower by the transverse direction outer side end portion 38B of the inner side wall 38. In other words, a structure is employed in which the second holding portion 42A is not visible from the cabin C side by the transverse direction outer side end portion 38B of the inner side wall 38.

As has been described above, in the present exemplary embodiment, by providing the inner side transparent portion 44B and the outer side transparent portion 44A in the pillar portion 32, a structure is created in which the field of view FV is formed in the blind spot area BS obstructed by the pillar portion 32, so that objects outside the vehicle are visible via the inner side transparent portion 44B and the outer side transparent portion 44A. Because of this, in the present exemplary embodiment, the inner side transparent portion 44B and the outer side transparent portion 44A are formed so as to be transparent such that, when the driver P sees an object outside the vehicle via the inner side transparent portion 44B and the outer side transparent portion 44A, the driver P is able to visually confirm that object. Namely, as an example, the transmittance of each of the inner side transparent portion 44B and the outer side transparent portion 44A can be set to 50% or more.

Next, actions and effects of the vehicle pillar structure S according to the present exemplary embodiment will be described.

In the vehicle pillar structure S having the above-described structure, the front pillar 30 has the pillar portion 32, and the pillar portion 32 extends in parallel with the vehicle transverse direction outer side end portion 14A of the windshield glass 14. As a consequence, because the pillar portion 32 is disposed diagonally forwards and to the right of the driver P, a blind spot area BS where the view of the driver P is obstructed by the pillar portion 32 is created. The pillar portion 32 has the hollow structure 34 when viewed from the longitudinal direction of the pillar portion 32. Namely, the pillar portion 32 is formed as a hollow structure. Moreover, the pillar portion 32 is formed so as to include the outer side wall 36 which forms the wall portion on the outer side in the vehicle transverse direction of the pillar portion 32, the inner side wall 38 which forms the wall portion on the cabin C side of the pillar portion 32, and the pair of side walls 40 and 42 which link together the outer side wall 36 and the inner side wall 38.

Here, the intermediate portion in the vehicle transverse direction of the outer side wall 36 is formed as the outer side transparent portion 44A, and the outer side transparent portion 44A extends over the entire longitudinal direction of the pillar portion 32. Moreover, the intermediate portion in the vehicle transverse direction of the inner side wall 38 is formed as the inner side transparent portion 44B, and the inner side transparent portion 44B extends over the entire longitudinal direction of the pillar portion 32. Furthermore, the inner side transparent portion 44B is disposed such that, as seen by the driver P, it overlaps with the outer side transparent portion 44A. Because of this, a field of view FV where areas on the vehicle exterior side of the pillar portion 32 are visible to the driver P is formed in the blind spot area BS that is obstructed by the pillar portion 32. As a consequence, in spite of the pillar portion 32 being provided, objects outside the vehicle are able to be seen through the inner side transparent portion 44B and the outer side transparent portion 44A.

Furthermore, as is described above, the pillar portion 32 is formed as a hollow structure. Because of this, compared with a pillar portion 32 that is formed as a solid structure, specifically, compared with a pillar portion 32 in which the outer side transparent portion 44A and the inner side transparent portion 44B are a single integral body so that the transparent portion 44 is formed as a solid object, the plate thicknesses of the inner side transparent portion 44B and the outer side transparent portion 44A can be made thinner. As a consequence, it is possible to prevent any increase in the distortion of an object that is caused by the refraction of light transmitted through the inner side transparent portion 44B and the outer side transparent portion 44A. Accordingly, in the front pillar 30, compared with a pillar portion 32 that is formed as a solid object, it is possible to improve the visibility of objects on the vehicle exterior side of the pillar portion 32 as seen by the driver P.

Moreover, portions of the pillar portion 32 other than the outer side transparent portion 44A and the inner side transparent portion 44B are formed as the high-strength portions 46 that have a higher flexural strength than the outer side transparent portion 44A and the inner side transparent portion 44B. As a consequence, even if the pillar portion 32 is formed as a hollow structure, it is still possible to guarantee the flexural strength of the pillar portion 32 as a whole. Accordingly, it is possible to improve the visibility of an object on the vehicle exterior side of the pillar portion 32 as seen by the driver P while still maintaining the flexural strength of the pillar portion 32.

Moreover, the first holding portion 40A is formed at the side wall 40 on the windshield glass 14 side of the pillar portion 32, and the first holding portion 40A protrudes towards the inner side of the hollow structure 34 of the pillar portion 32 so as to hold the vehicle transverse direction outer side end portion 14A of the windshield glass 14. In addition, the second holding portion 42A is formed at the side wall 42 on the side door glass 22 side of the pillar portion 32, and the second holding portion 42A protrudes towards the inner side of the hollow structure 34 of the pillar portion 32 so as to hold the door seal 56. The first holding portion 40A and the second holding portion 42A form the high-strength portions 46, and the high-strength portions 46 are formed from opaque carbon fiber-reinforced plastic. Because of this, it is possible to largely prevent the portion of the first holding portion 40A that holds the windshield glass 14, and the portion of the second holding portion 42A that holds the door seal 56, namely, the portion that holds the door seal 56 via the retainer 54 from being visible from the cabin C side, more specifically, from being visible to the driver P. Accordingly, it is possible to improve the visibility of an object on the vehicle exterior side of the pillar portion 32 as seen by the driver P while improving the design aspect of the vehicle V as seen from the cabin C side.

Moreover, the transverse direction outer side end portions 36A and 36B of the outer side wall 36 and the transverse direction outer side end portions 38A and 38B of the inner side wall 38 are formed as the high-strength portions 46 and, as is stated above, the high-strength portions 46 are formed from opaque carbon fiber-reinforced plastic. Because of this, the first holding portion 40A and the second holding portion 42A are prevented from being visible in the facing direction from outside the vehicle by the transverse direction outer side end portions 36A and 36B of the outer side wall 36. Furthermore, the first holding portion 40A and the second holding portion 42A are prevented from being visible in the facing direction from the cabin C side by the transverse direction outer side end portions 38A and 38B of the inner side wall 38. As a consequence, it is possible to improve the visibility of an object on the vehicle exterior side of the pillar portion 32 as seen by the driver P while further improving the design aspect of the vehicle V as seen from both the vehicle exterior side and the cabin C side.

Moreover, apart from a boundary portion between the inner side wall 38 and the side wall 40, the plate thickness of the outer side transparent portion 44A and the inner side transparent portion 44B is set to 5 mm. As a consequence, it is possible to prevent any increase in the distortion of an object that is caused by the refraction of light transmitted through the inner side transparent portion 44B and the outer side transparent portion 44A, while still maintaining the strength of the pillar portion 32. Accordingly, it is possible to effectively improve the visibility of objects on the vehicle exterior side of the pillar portion 32 as seen by the driver P.

Moreover, the radius of curvature of the outer side wall 36, namely, the outer side transparent portion 44A and of the inner side wall 38, namely, the inner side transparent portion 44B is set to 500 mm or more. Because of this, the outer side transparent portion 44A and the inner side transparent portion 44B can be formed in a substantially planar shape. As a consequence, when viewing objects outside the vehicle via the inner side transparent portion 44B and the outer side transparent portion 44A, it is possible to even further reduce any distortion when viewing these objects.

Furthermore, the outer side transparent portion 44A and the inner side transparent portion 44B are formed from fiber-reinforced plastic (i.e., glass fiber-reinforced polycarbonate), and the high-strength portions 46 are formed from carbon fiber-reinforced plastic (i.e., carbon fiber reinforced polycarbonate). Because of this, the outer side transparent portion 44A, the inner side transparent portion 44B, and the high-strength portions 46 can be easily formed as a single integral body via a process such as integral molding or the like. As a consequence, compared, for example, with when the outer side transparent portion 44A and inner side transparent portion 44B and the high-strength portions 46 are bonded together by adhesion or the like, it is possible to bond the outer side transparent portion 44A and inner side transparent portion 44B and the high-strength portions 46 together extremely strongly while preventing the pillar portion 32 from becoming bulkier in size. Namely, if the outer side transparent portion 44A and inner side transparent portion 44B and the high-strength portions 46 were formed from mutually different materials, then consideration might be given to bonding the outer side transparent portion 44A and inner side transparent portion 44B and the high-strength portions 46 together by adhesion or the like. In such a case, because it would be necessary to increase the bonding surface area of both parties in order to secure sufficient bond strength, it is likely that the size of the pillar portion 32 would increase. In contrast to this, in the present exemplary embodiment, because each one of the outer side transparent portion 44A and inner side transparent portion 44B and the high-strength portions 46 is formed from a resin material, both parties can be easily formed as a single integral body via a process such as integral molding or the like.

Note that, in the present exemplary embodiment, an intermediate portion in the transverse direction of the outer side wall 36 is formed as the outer side transparent portion 44A, and the transverse direction outer side end portions 36A and 36B of the outer side wall 36 are formed as the high-strength portions 46, however, it is also possible to employ a structure in which the entire outer side wall 36 is formed as the outer side transparent portion 44A. Furthermore, in the present exemplary embodiment, an intermediate portion in the transverse direction of the inner side wall 38 is formed as the inner side transparent portion 44B, and the transverse direction outer side end portions 38A and 38B of the inner side wall 38 are formed as the high-strength portions 46, however, it is also possible to employ a structure in which the entire inner side wall 38 is formed as the inner side transparent portion 44B.

Moreover, in the present exemplary embodiment, the outer side transparent portion 44A and the inner side transparent portion 44B extend for the entire longitudinal direction of the pillar portion 32. In other words, the outer side transparent portion 44A and the inner side transparent portion 44B extend continuously in the longitudinal direction of the pillar portion 32. Instead of this, it is also possible to employ a structure in which the outer side transparent portion 44A and the inner side transparent portion 44B extend intermittently in the longitudinal direction of the pillar portion 32.

Moreover, in the present exemplary embodiment, the plate thickness of the outer side transparent portion 44A and the inner side transparent portion 44B is set to 5 mm, however, the plate thickness of the outer side transparent portion 44A and the inner side transparent portion 44B can be altered to a desired value. For example, it is also possible to set the thickness of the outer side transparent portion 44A and the inner side transparent portion 44B to a thinner dimension than the thickness of the high-strength portions 46. In this case, if the moldability and flexural strength and the like of the outer side transparent portion 44A and the inner side transparent portion 44B are considered, then the plate thickness of the outer side transparent portion 44A and the inner side transparent portion 44B may be set to not less than 0.5 mm and not more than 5 mm. Moreover, if the outer side transparent portion 44A and the inner side transparent portion 44B are formed from a resin material having a high transmittance, then if the weight and the like of the front pillar 30 are considered, it is also possible for the thickness of the outer side transparent portion 44A and the inner side transparent portion 44B to be set to a predetermined thickness that is thicker than 5 mm. Namely, the thickness dimension of the outer side transparent portion 44A and the inner side transparent portion 44B may be set thicker than the thickness dimension of the high-strength portions 46.

Moreover, in the present exemplary embodiment, the plate thickness of the outer side transparent portion 44A and the inner side transparent portion 44B are set to the same plate thickness, however, it is also possible for the plate thickness of the outer side transparent portion 44A and on the inner side transparent portion 44B to be set to mutually different plate thicknesses. For example, it is also possible for the plate thickness of the outer side transparent portion 44A to be formed thicker than the plate thickness of the inner side transparent portion 44B. By doing this, the flexural strength of the outer side transparent portion 44A can be made higher than the flexural strength of the inner side transparent portion 44B. As a result of this, it is possible to secure the flexural strength of the entire front pillar 30 by means of the outer side transparent portion 44A while alleviating the impact on the driver P in the event, for example, of the vehicle V experiencing an offset frontal collision such that the driver P is moved towards the pillar portion 32 side and strikes against the pillar portion 32.

Moreover, in the present exemplary embodiment, the outer side transparent portion 44A and the inner side transparent portion 44B are formed from glass fiber-reinforced plastic, while the high-strength portions 46 are formed from carbon fiber-reinforced plastic, however, the materials used to form the outer side transparent portion 44A, the inner side transparent portion 44B, and the high-strength portions 46 are not limited to these. For example, it is also possible to form the outer side transparent portion 44A and the inner side transparent portion 44B from a transparent resin material that does not contain fibers. It is also possible to form one of the outer side transparent portion 44A and the inner side transparent portion 44B from a fiber-reinforced plastic, and to form the other one of the outer side transparent portion 44A and the inner side transparent portion 44B from a transparent resin material that does not contain fibers. Furthermore, it is also possible to employ a structure in which the outer side transparent portion 44A and the inner side transparent portion 44B are formed from a ceramic such as glass, and to form the high-strength portions 46 from a ceramic such as glass or from a metal having a higher flexural strength than the outer side transparent portion 44A and the inner side transparent portion 44B.

In the present exemplary embodiment, the flexural strength of the high-strength portions 46 is formed higher than the flexural strength of the outer side transparent portion 44A and the inner side transparent portion 44B, however, it is also possible to form the flexural strength of the high-strength portions 46 lower than the flexural strength of the outer side transparent portion 44A and the inner side transparent portion 44B. In this case, reinforcement components, for example, may be provided in the side walls 40 and 42 so as to reinforce the high-strength portions 46.

Moreover, in the present exemplary embodiment, an example is described in which the vehicle pillar structure S is applied to the front pillar 30 on the driver's side, however, the application of the vehicle pillar structure S is not limited to the driver's side. For example, the vehicle pillar structure S may also be applied to the front pillar 30 on the passenger's side. By doing this, any objects located in a blind spot that is obstructed from the driver's view by the front pillar 30 on the passenger's side are able to be viewed through the outer side transparent portion 44A and the inner side transparent portion 44B. Furthermore, although not shown in the drawings, the vehicle pillar structure S may also be applied to a rear pillar that is located between the rear windshield glass and the side door glass that is provided in a side portion of the cabin C.

Moreover, in the present exemplary embodiment, the vehicle pillar structure S is applied to a right-hand drive vehicle V, however, the vehicle pillar structure S may also be applied to a left-hand drive vehicle.

What is claimed is:

1. A vehicle pillar structure comprising:
a pillar portion, the pillar portion extending in parallel with an outer side end portion in a vehicle transverse direction of a windshield glass and, as viewed from a longitudinal direction of the pillar portion, having a hollow structure, and the pillar portion comprising:
an outer side wall forming a wall portion at a vehicle outer side of the pillar portion;
a solid inner side wall forming a wall portion at a vehicle cabin side of the pillar portion; and
a pair of side walls linking the outer side wall and the inner side wall together, wherein:
at least a portion of the outer side wall is an outer side transparent portion,
at least a portion of the inner side wall is an inner side transparent portion that is disposed so as to face the outer side transparent portion as viewed by a driver, and
portions of the pillar portion other than the outer side transparent portion and the inner side transparent portion are high-strength portions that have a higher flexural strength than the outer side transparent portion and the inner side transparent portion.

2. The vehicle pillar structure according to claim 1, wherein:
a first holding portion is provided at one of the pair of side walls, the first holding portion protruding towards an inner side of the hollow structure, and holding a vehicle transverse direction outer side end portion of the windshield glass,
a second holding portion is provided at another of the pair of side walls, the second holding portion protruding towards the inner side of the hollow structure, and holding a sealing component, and
the high-strength portions are formed from an opaque material.

3. The vehicle pillar structure according to claim 2, wherein:

transverse direction outer side end portions of the outer side wall and the inner side wall are connected to the pair of side walls, and the transverse direction outer side end portions are configured by the high-strength portions.

4. The vehicle pillar structure according to claim 1, wherein a plate thickness of the outer side transparent portion and the inner side transparent portion is from 0.5 mm to 5 mm.

5. The vehicle pillar structure according to claim 4, wherein:

in a planar cross-sectional view from a vehicle upper side, the outer side transparent portion is formed in a curved shape and protrudes towards the vehicle outer side, and the inner side transparent portion is formed in a curved shape and protrudes towards a vehicle cabin inner side, and a radius of curvature of the outer side transparent portion and of the inner side transparent portion is 500 mm or more.

6. The vehicle pillar structure according to claim 1, wherein:

the outer side transparent portion and the inner side transparent portion are formed from a transparent resin material, and the high-strength portions are formed from carbon fiber-reinforced plastic.

7. The vehicle pillar structure according to claim 3, wherein, in a planar cross-sectional view from a vehicle upper side:

the outer side wall is provided with the transverse direction outer side end portions on both sides of the outer side transparent portion, and the inner side wall is provided with the transverse direction outer side end portions on both sides of the inner side transparent portion.

* * * * *